United States Patent
Fimeri et al.

(10) Patent No.: US 10,293,742 B2
(45) Date of Patent: May 21, 2019

(54) LAMP ASSEMBLY FOR A VEHICLE

(71) Applicant: SMR Patents S.à.r.l., Luxembourg (LU)

(72) Inventors: Garry Gordon Leslie Fimeri, Adelaide (AU); Simon Belcher, Adelaide (AU); James Nicholas Dickson, Adelaide (AU)

(73) Assignee: SMR Patents S.à.r.l., Luxembourg (LU)

( * ) Notice: Subject to any disclaimer, the term of this patent is extended or adjusted under 35 U.S.C. 154(b) by 83 days.

(21) Appl. No.: 15/522,317

(22) PCT Filed: Oct. 26, 2015

(86) PCT No.: PCT/IB2015/058231
§ 371 (c)(1),
(2) Date: Apr. 27, 2017

(87) PCT Pub. No.: WO2016/067175
PCT Pub. Date: May 6, 2016

(65) Prior Publication Data
US 2018/0290587 A1  Oct. 11, 2018

(30) Foreign Application Priority Data
Oct. 27, 2014 (AU) ................................ 2014904288

(51) Int. Cl.
*F21V 5/00* (2018.01)
*B60Q 1/26* (2006.01)
(Continued)

(52) U.S. Cl.
CPC ............. *B60Q 1/2665* (2013.01); *B60Q 1/38* (2013.01); *F21S 43/14* (2018.01); *F21S 43/26* (2018.01);
(Continued)

(58) Field of Classification Search
None
See application file for complete search history.

(56) References Cited

U.S. PATENT DOCUMENTS

2003/0035299 A1    2/2003   Amano
2009/0027911 A1    1/2009   Misawa
(Continued)

FOREIGN PATENT DOCUMENTS

EP    0678703 A1    10/1995
EP    1258394 A2    11/2002
(Continued)

OTHER PUBLICATIONS

International Search Report dated Jan. 25, 2016, 5 pgs.
PCT Written Opinion of the International Searching Authority, Application No. PCT/IB2015/058231, dated Jan. 25, 2016, 8 pgs.

*Primary Examiner* — Vip Patel
(74) *Attorney, Agent, or Firm* — Jones Day

(57) ABSTRACT

A lamp assembly for a vehicle is disclosed. The assembly includes a reflector having a proximal end and a distal end. The reflector has a surface having a plurality of reflective faces spread over an arc therebetween, the arc being generally concave. The reflector forms part of a recess, the recess having spaced-apart parallel walls. A light emitting diode (LED) light source is disposed near the proximal end of the reflector and remote from the distal end of the reflector and the light source is oriented to emit light onto the reflective faces. A lens is positioned in front of the reflector. The lens is arranged to receive light from the reflector. In use, light is output from the lens with a substantially uniform luminance over a viewing angle of at least 45 degrees in a plane.

9 Claims, 6 Drawing Sheets

(51) Int. Cl.

| | | |
|---|---|---|
| *F21S 43/14* | (2018.01) | |
| *F21S 43/20* | (2018.01) | |
| *F21S 43/31* | (2018.01) | |
| *F21S 43/40* | (2018.01) | |
| *B60Q 1/38* | (2006.01) | |
| *F21Y 115/10* | (2016.01) | |
| *F21W 103/20* | (2018.01) | |

(52) U.S. Cl.
 CPC .............. *F21S 43/31* (2018.01); *F21S 43/40* (2018.01); *F21W 2103/20* (2018.01); *F21Y 2115/10* (2016.08)

(56) References Cited

U.S. PATENT DOCUMENTS

| | | | |
|---|---|---|---|
| 2011/0058357 A1* | 3/2011 | Anderson | ............... A47F 3/001 |
| | | | 362/125 |
| 2012/0170296 A1* | 7/2012 | Ostrowski | ............... F21S 43/13 |
| | | | 362/519 |

FOREIGN PATENT DOCUMENTS

| | | |
|---|---|---|
| EP | 1355108 A2 | 10/2003 |
| EP | 1411291 A2 | 4/2004 |
| FR | 2785973 A1 | 5/2000 |

\* cited by examiner

LAMP ASSEMBLY FOR A VEHICLE

CROSS-REFERENCE TO RELATED APPLICATIONS

This application is a national stage entry of International Patent Application No. PCT/IB2015/058231, filed Oct. 26, 2015, which claims the benefit of foreign priority to Australian Patent Application No. 2014904288, filed Oct. 27, 2014, each of which is incorporated herein by reference in its entirety for all purposes.

STATEMENT REGARDING FEDERALLY SPONSORED RESEARCH OR DEVELOPMENT

Not applicable.

REFERENCE TO A COMPACT DISK APPENDIX

Not applicable.

BACKGROUND

1. Field

The following description relates to lamp assemblies. In a particular form the following description relates to lamp assemblies for an exterior rear view mirror assembly of a vehicle.

2. Description of Related Art

Automotive lighting arrangements are increasingly being used in vehicle side mirrors (exterior rear view mirror assemblies) as value added features required by automotive manufacturers. An example of this is mirror assemblies that are manufactured with turn signal indicator (STI) lights. Light emitting diodes (LEDs) are also being used more frequently as the light source in these lighting arrangements. In addition to the functionality of these lighting systems, another important design consideration is the aesthetic appearance of the light output from these systems.

In particular, it is desirable to provide a lighting arrangement using one or more LED light sources that is able to provide an output having an even (uniform or homogenous) area luminance). This is difficult to achieve as an LED light source is inherently directional (with an approximate Lambertian distribution) meaning that the relative luminous intensity of the LED varies away from the central axis of the LED. The luminous intensity is highest at 0° (along central axis) and drops off significantly as the viewing angle approaches 90°. Because of this, a lighting arrangement using a series of LED light sources tends to create a series of "hot spots" (or conversely dark regions) that are visible to an external viewer of the lighting arrangement. In other words, the light output is not of even intensity across a particular viewing surface.

One method of obtaining a light output over a surface having substantially uniform luminous intensity using one or more LED light sources is to use a dedicated light pipe that receives light from the LED light source(s) and directs it towards a targeted output surface (usually by using a range of optical surfaces-surface defects, etches, shaped optics etc). While a light pipe could be used, this solution may not be cost feasible due to the cost associated in manufacturing the light pipe.

There is therefore a need to provide a useful alternative to using a light pipe in a lighting arrangement that provides a light output over a surface having substantially uniform luminous intensity using one or more LED light sources.

Other advantages of the present invention will become apparent from the following description, taken in connection with the accompanying drawings, wherein, by way of illustration and example, a preferred embodiment of the present invention is disclosed.

SUMMARY

According to a first aspect, there is provided a lamp assembly for a vehicle including: a reflector having a proximal end and a distal end, the reflector having a surface having a plurality of reflective faces spread over an arc therebetween, the arc being generally concave, the reflector forming part of a recess, the recess having spaced-apart parallel walls; a light emitting diode (LED) light source disposed near the proximal end of the reflector and remote from the distal end of the reflector, the light source oriented to emit light onto the reflective faces; and a lens positioned in front of the reflector, the lens arranged to receive light from the reflector and having an inner surface, whereby, in use, light is output from the lens with a substantially uniform luminance over a viewing angle of at least 45 degrees in a plane.

In one form, the plane is a horizontal plane.

In one form, the inner surface includes surface optics to diffuse light incident upon the lens.

In one form, the surface optics include a waveform structure consisting of a plurality of peaks and troughs, the peaks and troughs being orientated substantially perpendicular to the walls of the recess.

In one form, the peaks and troughs are orientated substantially parallel to the reflective faces of the reflector.

In one form, the spaced apart parallel walls of the recess are reflective, in use concentrating the light output from the reflector in a vertical plane.

In one form, each of the reflective faces have a curved surface configured to spread light towards the inner surface of the lens in a horizontal plane.

In one form, the curvature of each of the reflective faces is arranged to spread light over a majority of the inner surface of the lens such that the light reflected from the reflective faces overlaps.

According to a second aspect, there is provided a lamp assembly for a vehicle including: a first reflector having a proximal end and a distal end, the reflector having a surface having a plurality of first reflective faces spread over an arc therebetween, the arc being generally concave, the reflector forming part of a first recess, the recess having a first pair of spaced-apart parallel walls; a first light emitting diode (LED) light source disposed near the proximal end of the first reflector and remote from the distal end of the first reflector, the first light source oriented to emit light onto the first reflective faces; a second reflector having a proximal end and a distal end, the surface having a plurality of second reflective faces spread over an arc therebetween, the arc being generally concave, the reflector forming part of a second recess, the recess having a second pair of spaced-apart parallel walls; a second light emitting diode (LED) light source disposed near the proximal end of the second reflector and remote from the distal end of the second reflector, the second light source oriented to emit light onto the second reflective faces; and a lens positioned in front of the first and second reflectors, the lens arranged to receive light from the reflectors and having an inner surface, whereby, in use, light is output from the lens with a substantially uniform luminance over a viewing angle of at least 45 degrees in a plane.

In one form, the first and second reflectors are integral, the first and second reflectors converging together from their respective proximal ends to their respective distal ends.

In one form, the plane is a horizontal plane.

In one form, the inner surface includes surface optics to diffuse light incident upon the lens.

In one form, the surface optics include a waveform structure consisting of a plurality of peaks and troughs, the peaks and troughs being orientated substantially perpendicular to the walls of the recess.

In one form, the peaks and troughs are orientated substantially parallel to the reflective faces of the reflector.

In one form, the spaced apart parallel walls of the recess are reflective, in use concentrating the light output from the reflector in a vertical plane.

In one form, each of the first reflective faces have a curved surface configured to spread light towards a first portion of the inner surface of the lens in a horizontal plane. In one form, the curvature of each of the first reflective faces is arranged to spread light over a majority of the first portion of the inner surface of the lens such that the light reflected from the first reflective faces overlaps.

BRIEF DESCRIPTION OF THE DRAWINGS

Embodiments of the present invention will be discussed with reference to the accompanying drawings wherein.

DETAILED DESCRIPTION

Figure 1:
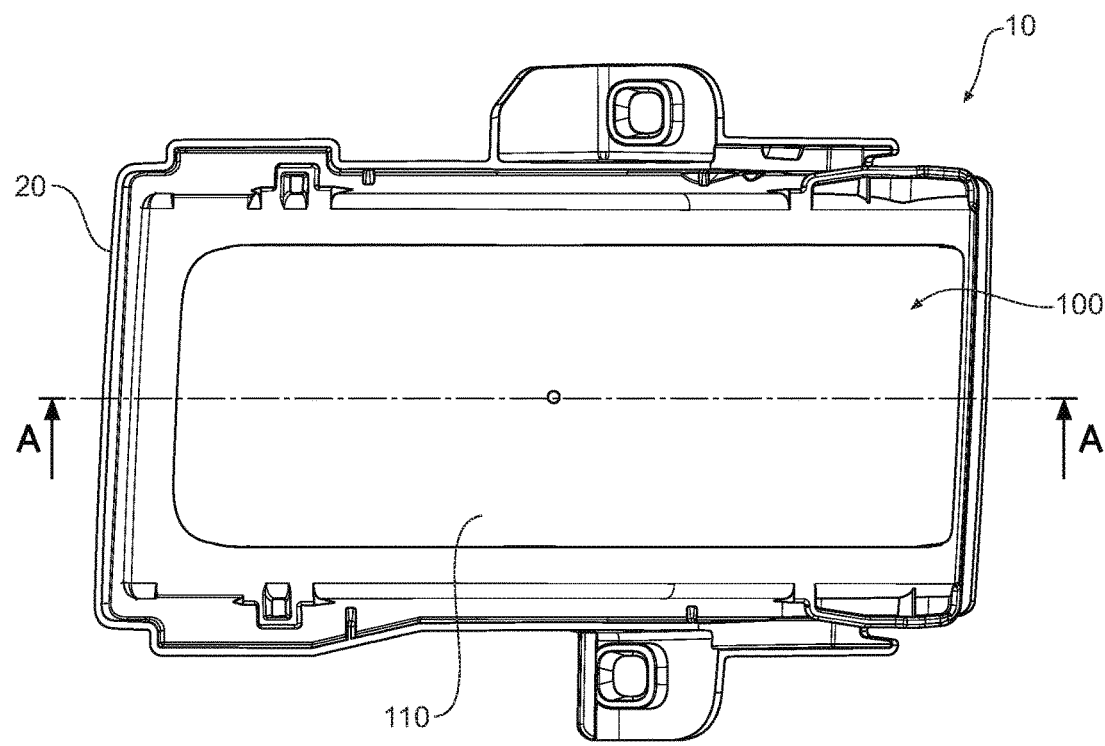
FIG. 1 is a side view of a lamp assembly for a vehicle.

Referring now to FIG. 1, there is shown a lamp assembly 10 for a vehicle. The lamp assembly may be integrated into an exterior rear view mirror (side mirror) assembly of a vehicle. In one form, the lamp assembly provides a clearance light configured to provide light output generally forward of the vehicle to provide a visual indication to oncoming traffic as to the width of the vehicle (the lamp assembly 10 is preferably installed in both a left and a right hand side mirror of the vehicle for this purpose).

Referring to FIGS. 3, 4, 5, 6A and 6B, the lamp assembly 10 includes a reflector 40 having a proximal end 41 and a distal end 42, the surface having a plurality of reflective faces spread over an arc therebetween, the arc being generally concave, the reflector forming part of a recess 32, the recess 32 having spaced-apart parallel walls 33, 35. A a light emitting diode (LED) light source 52 is disposed near the proximal end 41 of the reflector and remote from the distal end 42 of the reflector. The light source 52 is oriented to emit light onto the reflective faces 43 as is most clearly shown in FIGS. 6A and 6B. A lens 100 is positioned in front of the reflector 40. The lens 100 is arranged to receive light from the reflector 40 and has an inner surface 120. In use, light is output from the lens 100 with a substantially uniform luminance over a viewing angle of at least 45 degrees in a plane.

The lamp assembly 10 has a housing 20, a reflective moulding 30 mounted into the housing (see FIG. 2) and a lens 100 external to the housing covering the reflective moulding 30. The lens 100 is connected or joined to the housing 20 (e.g. by welding-see attachment points 130, 140 in FIG. 3) and has an inner surface 120 and an outer surface 110 which provides a viewing surface that is illuminated by the lamp assembly 10 in use. The reflective moulding 30 may be manufactured from a polycarbonate (PC) or other suitable substrate material. The reflective moulding 30 is coated using a vacuum metallization process which provides a reflectivity of approximately 80%. Alternatively, the reflective moulding could be manufactured from a naturally reflective substrate such as white PC. The lens 100 may be manufactured from an acrylic (PMMA) or other suitable transparent or semi-transparent substrate, and would typically be 1-3 mm thick.

Figure 3:
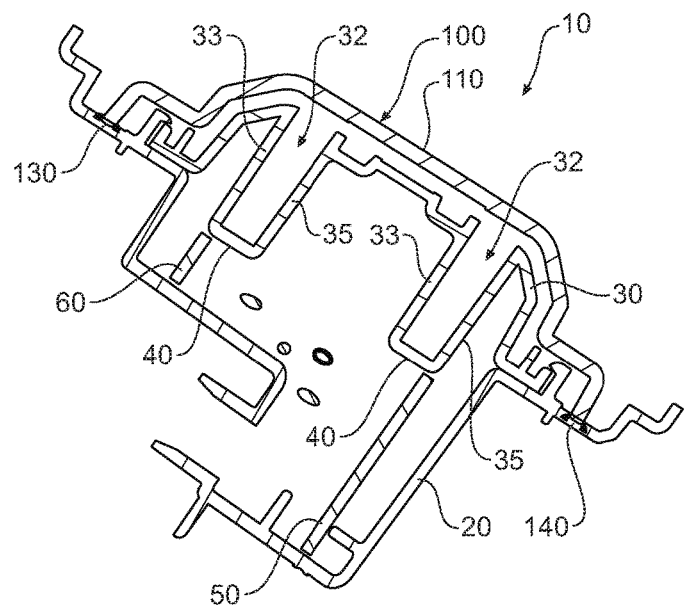
FIG. 3 is a sectional view of the lamp assembly taken through section B-B of FIG. 2.

FIG. 3 is a sectional view of the lamp assembly 10 illustrating recesses or pockets 32 formed in the reflective moulding 30 corresponding to upper and lower clearance lights. Each clearance light recess or pocket 32 has a rear wall 40 and upper and lower surfaces 33, 35 which project away from respective upper and lower edges of the rear wall 40 towards an opening of the recess 32 in the reflective moulding 30. The clearance light output is through the openings of upper and lower recesses 32. The upper and lower surfaces 33, 35 of each recess 32 act to concentrate the light output in a vertical plane. The effect of this concentration is that light exits from upper and lower recesses 32 in horizontal bands having a height substantially the same as the vertical spacing between upper and lower surfaces 33, 35.

Arranged in the housing 20 are upper and lower printed circuit boards (PCBs) 50, 60. Light emitting diode (LED) light sources for the clearance lights are mounted upon upper and lower PCBs 50, 60 respectively for corresponding upper and lower clearance lights of the lamp assembly 10.

Figure 4:
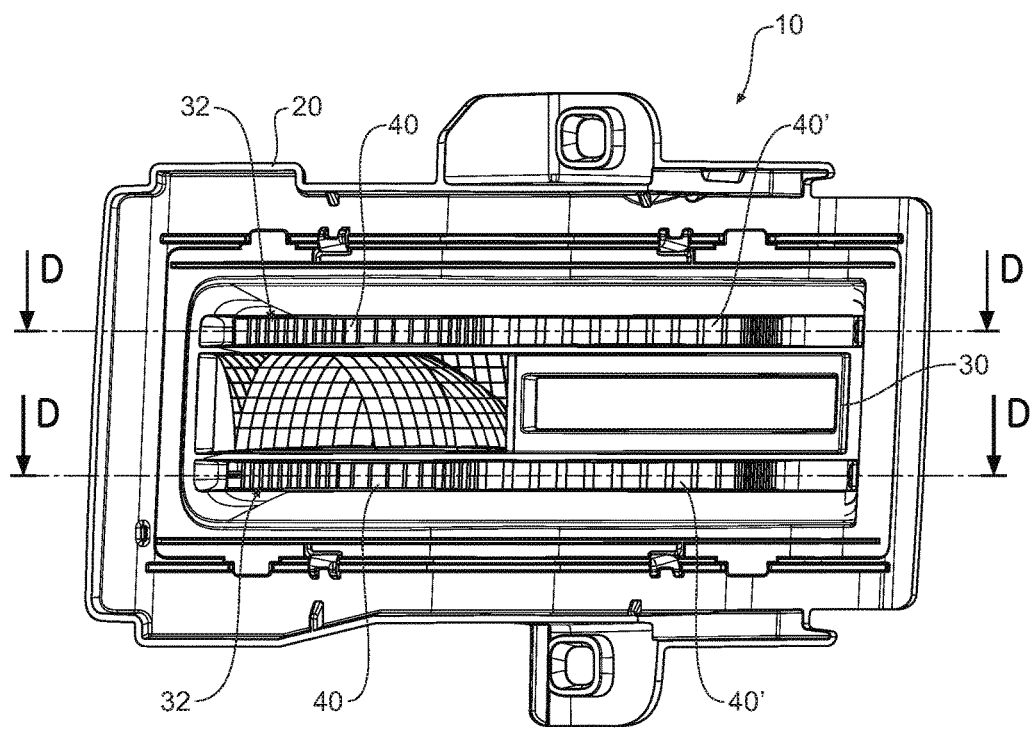
FIG. 4 is a side view of the lamp assembly of FIG. 1 with lens removed.

With reference to FIG. 4 there is shown a side view of the lamp assembly 10 with lens 100 removed for clarity to show the structure of the reflective moulding 30 in regions of the upper and lower clearance lights. Upper and lower recesses 32 are generally shown along with upper and lower rear walls 40 of each recess 32. In the embodiment shown in FIG. 4, the rear wall of a given recess has two portions, a first rear wall 40 and a second rear wall 40'. These rear walls are from hereon referred to as reflectors as light emitted from LED light sources associated with the clearance lights is reflected off of these structures. First rear wall 40 is therefore a first reflector 40 and second rear wall 40' is therefore a second reflector 40'. As shown in FIG. 4, each reflector 40, 40' has a plurality of reflective facets that extend vertically from the bottom of each reflector 40, 40' to the top of each reflector 40, 40' and span the length of the reflector 40, 40'.

Figure 5:
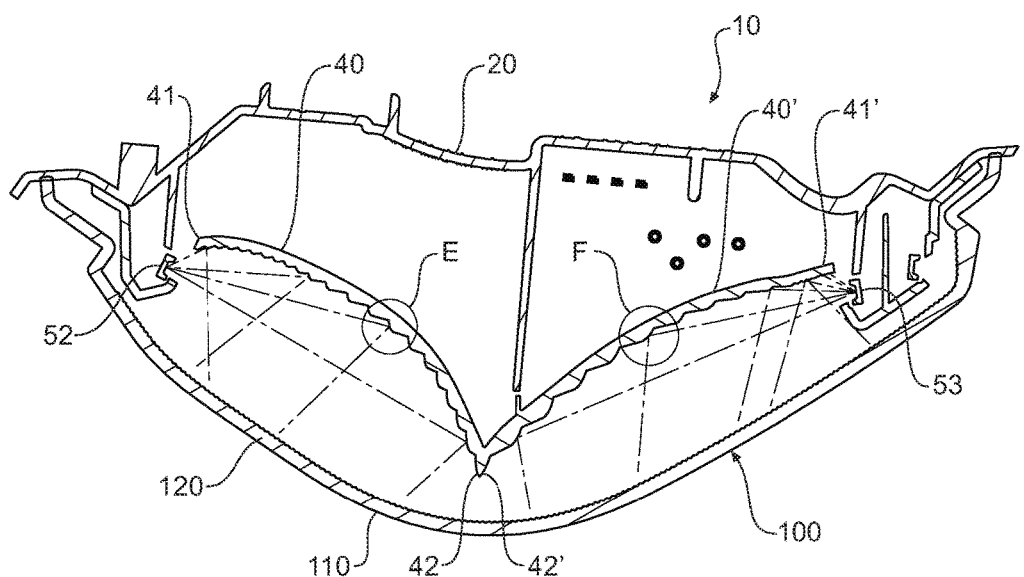
FIG. 5 is a sectional view of the lamp assembly taken through section D-D of FIG. 4.

The geometry of the clearance light reflectors 40, 40' is shown in more detail in FIG. 5 which is a sectional view taken through section D-D of FIG. 4. The following description is therefore in respect of either the upper or lower clearance light which have the same structure. The first reflector 40 has a proximal end 41 and a distal end 42 and a surface therebetween comprising a plurality of first reflective facets. The second reflector 40' has a proximal end 41' and distal end 42' and a surface therebetween comprised of a plurality of second reflective facets. Each reflector 40, 40' has a generally arcuate curvature between their respective first and distal ends. In the embodiment shown in FIG. 5, the first and second reflectors 40, 40' are integral such that they converge together from their respective proximal ends 41, 41' to their respective distal ends 42, 42'. In other forms, the first and second reflectors 40, 40' may be discrete elements.

The clearance light LED light sources 52, 53 are shown in FIG. 5 disposed near proximal ends 41, 41' respectively of the first and second reflectors 40, 40'. Light source 52 is oriented to emit light onto the plurality of first reflective facets while light source 53 is oriented to emit light onto the plurality of second reflective facets. The light sources 52, 53 are oriented such that a central axis (zero degree axis) of each light source is disposed at an angle of approximately 90° to the direction of light that is output through lens 100. In the embodiment shown in FIG. 5, the light sources 52, 53 are oriented such that the central axis is also oriented generally towards the centre of or distal end of each reflector 40, 40'. This is more clearly shown in FIGS. 11, where the central axes 49 and 49' of the light sources 52 and 53 respectively are shown.

Figure 6A:
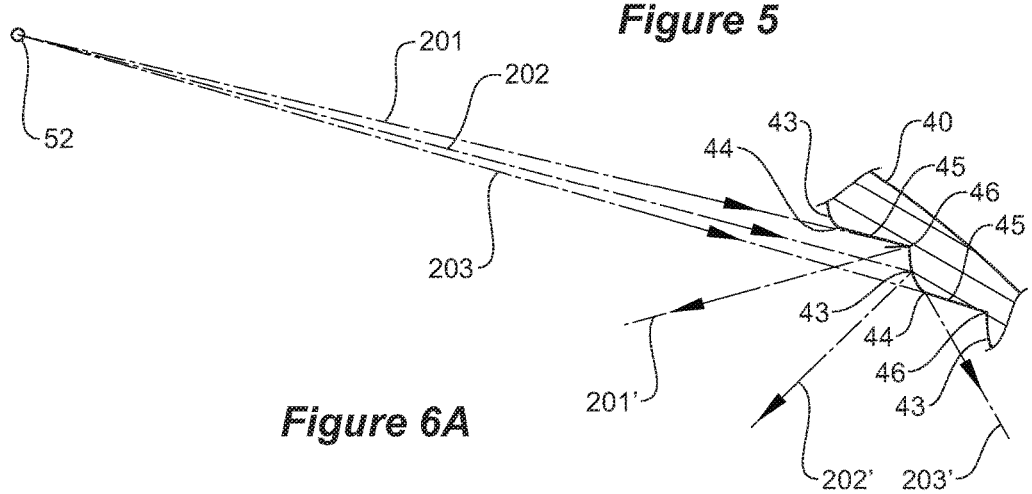
FIGS. 6a-6b provide enlarged views of the detail at E and F in FIG. 5 showing the structure of reflective facets of the clearance light reflector and the path of some light rays being reflected by the reflective facets.
Figure 6B:
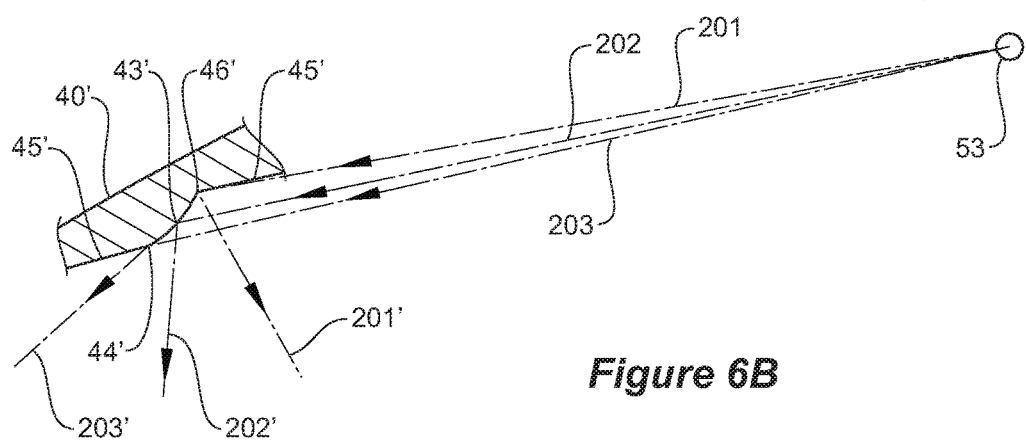

The reflective facets are now described in more detail with respect to FIGS. 6a-6b which provide enlarged views of the detail at E and F in FIG. 5. In FIG. 6a, light source 52 is shown emitting light rays 201, 202, 203 towards a reflective facet. The reflective facet comprises a curved surface forming a reflective face 43 which terminates in a ridge 44 and a straight angled surface 45 which extends from the ridge 44 towards a bottom or trough 46 of the reflective facet. As shown in FIG. 6a, the light rays 201, 202, 203 are incident upon the curved reflective face 43 of the reflective facet which then reflects the light rays towards the inner surface 120 of the lens 100. The reflected light rays 20, 202', 203' are spread in a horizontal plane by curved reflective face 43 of the reflective facet. The shape of curved reflective face 43 will determine how much incident light rays are spread in the horizontal plane. The straight angled surfaces 45' that extend between the ridge 44 and bottom 46 of adjacent curved faces 43 may be designed as shown such that incident light rays are aligned (collinear) with the angled surfaces 45'. Accordingly, light is not reflected from these angled surfaces 45'.

As shown in FIG. 5, there are more reflective facets near end 41 of reflector 40 than near end 42. The distance (spacing or pitch) between adjacent reflective facets (for example between adjacent ridges 44) increases along the length of the reflector 40 proximal end. The curvature of curved reflective faces 43 of each reflective facet is varied as necessary to spread incident light over a large portion of the area of the lens 100. The curvature of each of the reflective faces is arranged to spread light over a majority of the inner surface of the lens such that the light reflected from the reflective faces overlaps. This creates multiple overlaps in illumination as is most clearly shown in FIG. 11 and minimises 'hot spots' or 'bright spots'.

Similar to FIG. 6a, FIG. 6b illustrates light source 53 emitting light rays 201, 202, 203 towards a reflective facet of reflector 40'. The reflective facet comprises a curved surface forming a reflective face 43' which terminates in a ridge 44' and a straight angled surface 45' which extends from the ridge 44' towards a bottom or trough 46' of the reflective facet. The light rays 201, 202, 203 are incident upon the curved face reflective 43' of the reflective facet which then reflects the light rays towards the inner surface 120 of the lens 100. The reflected light rays 201', 202', 203' are spread in a horizontal plane by curved reflective face 43' of the reflective facet. The shape of curved face 43 will determine how much incident light rays are spread in the horizontal plane. The straight angled surfaces 45' that extend between the ridge 44 and bottom 46 of adjacent curved reflective faces 43 may be designed as shown such that incident light rays are aligned (collinear) with the angled surfaces 45'. Accordingly, light is not reflected from these angled surfaces 45'. As described above, the light or luminous intensity across the viewing surface of the lens 100 can be made substantially uniform or even. The first and second reflectors 40, 40' shown in FIG. 5 are asymmetrical and have a different arrangement of reflective facets. This is because the first and second reflectors 40, 40' are designed to aim light output in different directions.

Figure 7:
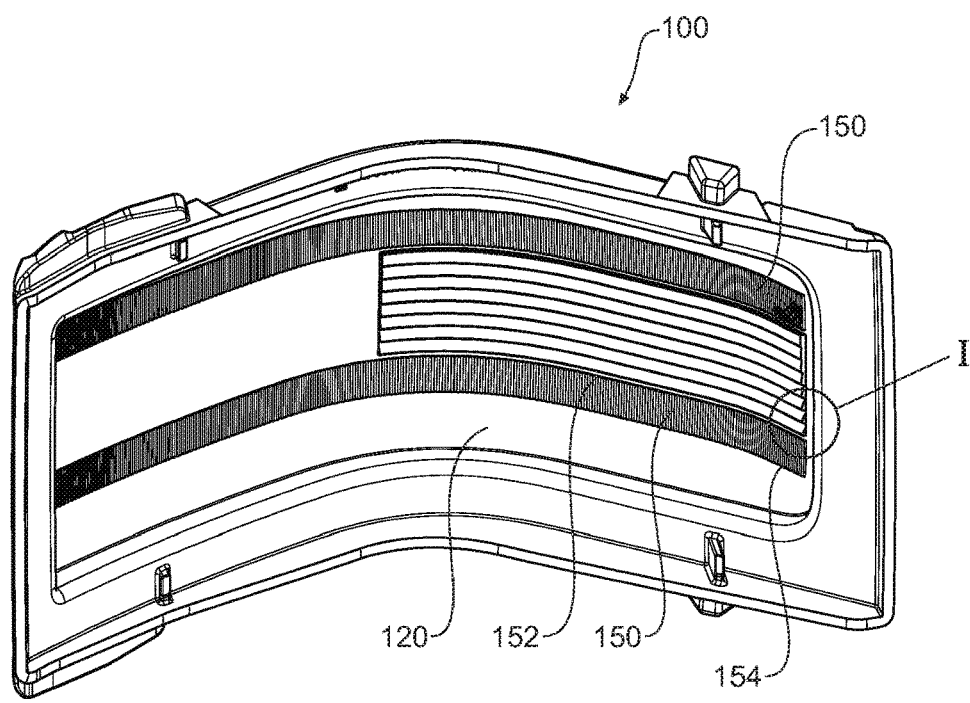
FIG. 7 is a rear perspective view of the lens showing surface optics on the inner surface of the lens.
Figure 8:
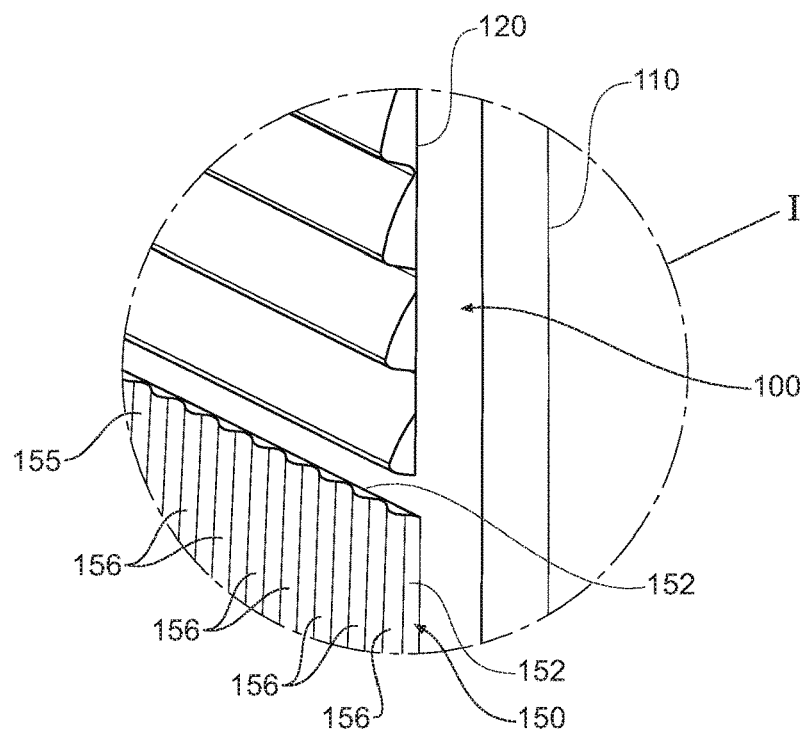
FIG. 8 provides an enlarged view of the detail at I in FIG. 7 showing in more detail the surface optics on the inner surface of the lens for the clearance light.

Referring now to FIGS. 7 and 8, the lens 100 is described in further detail. FIG. 7 shows the rear (inner) surface 120 of the lens 100. The inner surface 120 comprises an upper and lower band of contoured surface optics 150 which are disposed in front of the clearance light recesses 32 of the reflective moulding 30 when the lamp assembly 10 is assembled together. The surface optics 150 have an upper end 152 and a lower end 154 that correspond in spacing to the upper and lower surfaces 33, 35 of a recess 32. A detailed view of the surface optics 150 is provided in FIG. 8. The surface optics 150 have a waveform structure consisting of a plurality of peaks 156 and troughs 155 that extend vertically from upper end 152 to lower end 154. The waveform structure of the surface optics 150 functions to further spread light in the horizontal plane to assist in achieving a light output through the lens 100 of substantially uniform luminous intensity. The peaks and troughs of the surface optics are orientated substantially perpendicular to the walls 33, 35 of the recess 32.

Figure 11:
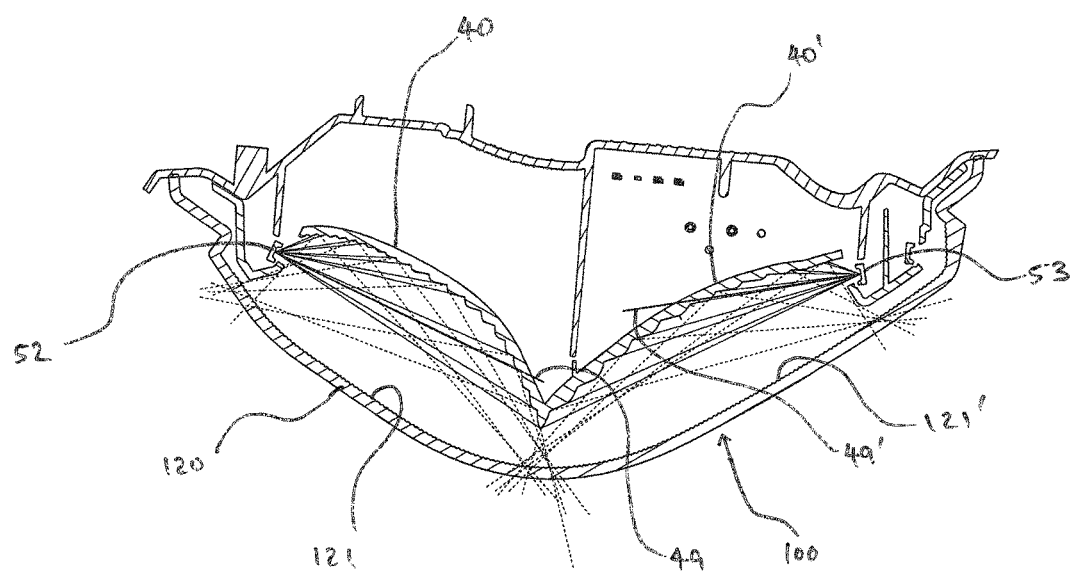
FIG. 11 is a sectional view of the lamp assembly similar to that of FIG. 5, but shows the overlapping light spread over the inner surface of the lens. In the following description, like reference characters designate like or corresponding parts throughout the figures.

FIG. 11 shows first and second portions 121 and 121' of the inner surface 120 of the lens 100. Each of the first reflective faces 43 have a curved surface configured to spread light towards a first portion 121 of the inner surface of the lens in a horizontal plane.

The curvature of each of the first reflective faces 43 is arranged to spread light over a majority of the first portion 121 of the inner surface of the lens 120 such that the light reflected from the first reflective faces 43 overlaps.

The arrangement described in the above two paragraphs also applies to the second reflective faces 43' and the corresponding second inner portions 121' of the lens 100 as is clearly shown in FIG. 11.

Embodiments of the lamp assembly of the present invention provide a light output over a surface having substantially uniform luminance (even brightness without hot spots) using one or more LED light sources. In other words, the lamp assembly is capable of producing a 'simulated light pipe' appearance without in fact using a light pipe.

Figure 2:
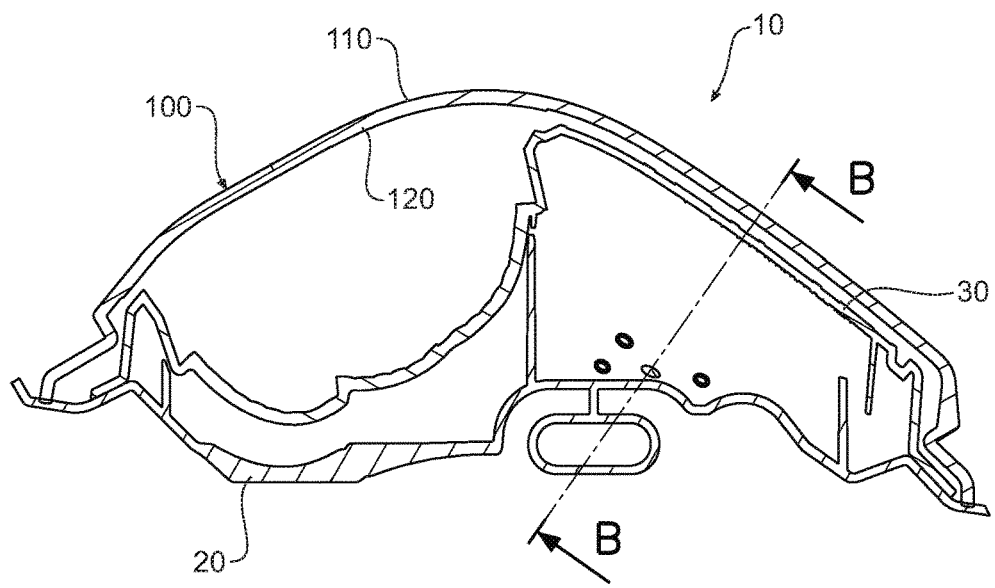
FIG. 2 is a sectional view of the lamp assembly taken through section A-A of FIG. 1.
Figure 9:
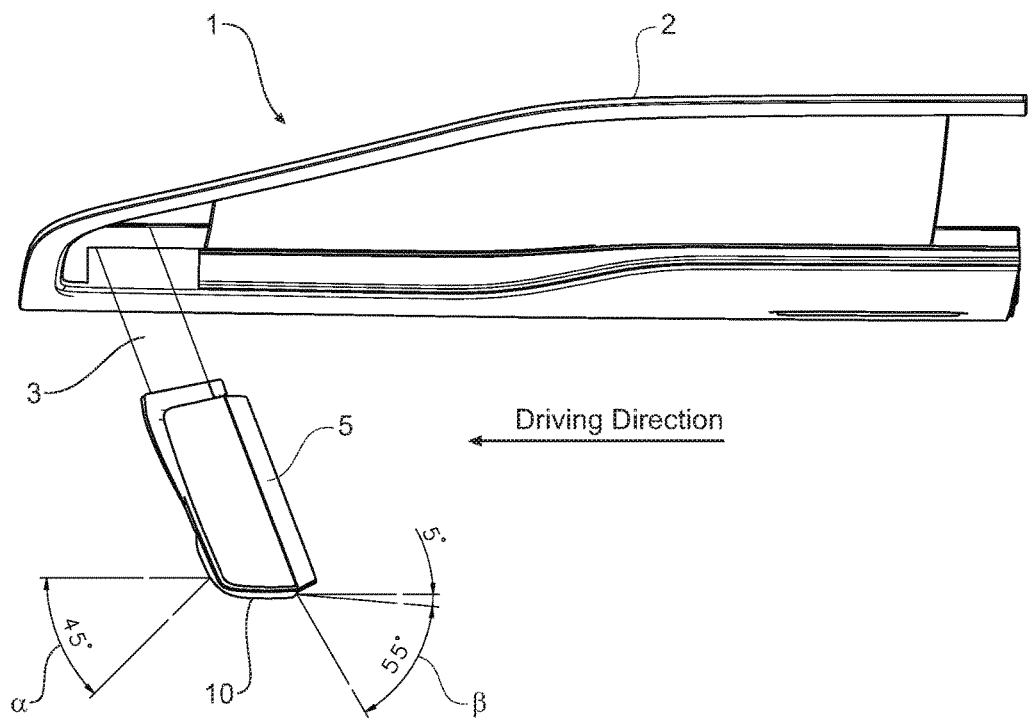
FIG. 9 is a top view of an exterior rear view mirror assembly mounted to a side door of a vehicle that is integrated with the lamp assembly.
Figure 10:
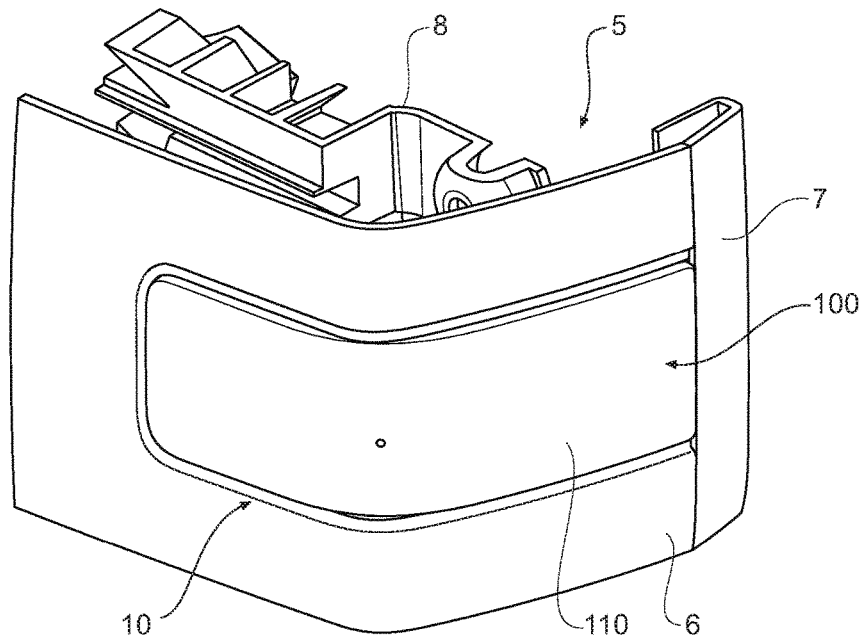
FIG. 10 is a perspective view of a portion of the exterior rear view mirror assembly of FIG. 9.

FIGS. 9 and 10 depict the lamp assembly 10 herein described integrated into an exterior rear view mirror assembly 5 of a vehicle 1. The mirror assembly 5 is mounted to a vehicle door 2 by a mirror arm 3 which extends from the side of the vehicle 1. The mirror assembly shown is on the left hand side of the vehicle. In an embodiment, the mirror assembly 5 may be mounted to the side of a truck (e.g. a light pickup truck or utility vehicle). The lamp assembly 10 shown in FIG. 1 is integrated into the mirror assembly 5 and adapted to wrap around an outboard edge of the mirror assembly 5. In this way, the lamp assembly shown in FIG. 1 is formed at an obtuse angle. Shown in FIG. 2 are examples of light output areas α, β from the lamp assembly 10. Light output area a (a predetermined viewing angle) corresponds to the clearance light output from the lamp assembly 10 that is generally forward of the vehicle 1. As previously mentioned, the clearance light is for the purpose of delineating the width of the vehicle 1 for oncoming motorists. In a preferred form as shown, a=45° outward from the centreline of the vehicle. FIG. 10 shows a perspective view of part of the mirror assembly 5 with the lamp assembly 10 mounted onto a mirror case frame 8. When installed, only the lens 100 is visible, the lens bordered by elements of the mirror casing 6, 7.

In addition to having a clearance light, the lamp assembly 10 may also have a turn signal lamp configured to provide light output generally rearward of the vehicle 1 in order to provide a visual indication to other road users that the vehicle 1 is turning. Light output area β corresponds to the turn signal light output from the lamp assembly 10. In a preferred form, β=55° from a line offset 5° from the centreline of the vehicle 1. The turn signal lamp will flash when activated and may be configured to flash simultaneously with the clearance light.

The lamp assembly 10 may further include a ground illumination or 'camping' light configured to illuminate a ground segment adjacent the vehicle 1. The ground illumination lamp may illuminate an area approximately 3 m out from the side of the vehicle and is used for general illumination, such as when a user is setting up a camping site.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

Please note that the following claims are provisional claims only, and are provided as examples of possible claims and are not intended to limit the scope of what may be claimed in any future patent applications based on the present application. Integers may be added to or omitted from the example claims at a later date so as to further define or re-define the invention.

What is claimed is:

1. A lamp assembly for a vehicle, comprising:
   a reflector having a proximal end and a distal end, the reflector having a surface having a plurality of reflective faces spread over an arc therebetween, the arc being generally concave, the reflector forming part of a recess, the recess having spaced-apart parallel walls;
   a light emitting diode (LED) light source disposed near the proximal end of the reflector and remote from the distal end of the reflector, the light source oriented to emit light onto the reflective faces; and
   a lens positioned in front of the reflector, the lens arranged to receive light from the reflector and having an inner surface,
   wherein, the inner surface includes surface optics to diffuse light incident upon the lens,
   wherein the surface optics include a waveform structure consisting of a plurality of peaks and troughs, the peaks and troughs being orientated substantially perpendicular to the walls of the recess and orientated substantially parallel to the reflective faces of the reflector, and
   wherein, in use, light is output from the lens with a substantially uniform luminance over a viewing angle of at least 45 degrees in a horizontal plane.

2. The lamp assembly of claim 1, wherein the spaced apart parallel walls of the recess are reflective, in use concentrating the light output from the reflector in a vertical plane.

3. The lamp assembly of claim 1, wherein each of the reflective faces have a curved surface configured to spread light towards the inner surface of the lens in a horizontal plane.

4. The lamp assembly of claim 3, wherein the curvature of each of the reflective faces is arranged to spread light over a majority of the inner surface of the lens such that the light reflected from the reflective faces overlaps.

5. A lamp assembly for a vehicle, comprising:
   a first reflector having a proximal end and a distal end, the reflector having a surface having
   a plurality of first reflective faces spread over an arc therebetween, the arc being generally concave, the reflector forming part of a first recess, the recess having a first pair of spaced-apart parallel walls;
   a first light emitting diode (LED) light source disposed near the proximal end of the first reflector and remote from the distal end of the first reflector, the first light source oriented to emit light onto the first reflective faces;
   a second reflector having a proximal end and a distal end, the surface having a plurality of second reflective faces spread over an arc therebetween, the arc being generally concave, the reflector forming part of a second recess, the recess having a second pair of spaced-apart parallel walls;
   a second light emitting diode (LED) light source disposed near the proximal end of the second reflector and remote from the distal end of the second reflector, the second light source oriented to emit light onto the second reflective faces; and
   a lens positioned in front of the first and second reflectors, the lens arranged to receive light from the reflectors and having an inner surface,
   wherein, the inner surface includes surface optics to diffuse light incident upon the lens,
   wherein the surface optics include a waveform structure consisting of a plurality of peaks and troughs, the peaks and troughs being orientated substantially perpendicular to the walls of the recess and orientated substantially parallel to the reflective faces of the reflector, and
   wherein, in use, light is output from the lens with a substantially uniform luminance over a viewing angle of at least 45 degrees in a plane.

6. The lamp assembly of claim 5, wherein the first and second reflectors are integral, the first and second reflectors converging together from their respective proximal ends to their respective distal ends.

7. The lamp assembly of claim 5, wherein the spaced apart parallel walls of the recess are reflective, in use concentrating the light output from the reflector in a vertical plane.

8. The lamp assembly of claim 5, wherein each of the first reflective faces have a curved surface configured to spread light towards a first portion of the inner surface of the lens in a horizontal plane.

9. The lamp assembly of claim 8, wherein the curvature of each of the first reflective faces is arranged to spread light over a majority of the first portion the inner surface of the lens such that the light reflected from the first reflective faces overlaps.

* * * * *